United States Patent [19]

Owings

[11] 3,761,967
[45] Oct. 2, 1973

[54] INTEGRATED PLUMBING FITTING

[75] Inventor: Joseph W. Owings, Smithfield, Tex.

[73] Assignee: American Standard Inc., New York, N.Y.

[22] Filed: Mar. 12, 1971

[21] Appl. No.: 123,648

[52] U.S. Cl. .................................. 4/192, 4/166
[51] Int. Cl. ..... E03c 1/042, E03c 1/044, A47k 4/00
[58] Field of Search........................ 4/191, 192, 166; 137/359; 285/221, 305

[56] References Cited
UNITED STATES PATENTS

| | | | |
|---|---|---|---|
| 1,150,098 | 8/1915 | Bunting................................. | 4/191 |
| 3,443,266 | 5/1969 | Mongerson et al..................... | 4/191 |
| 3,533,436 | 10/1970 | Parkison ............................ | 137/359 |
| 2,021,241 | 11/1935 | Mall..................................... | 285/305 |
| 1,946,207 | 2/1934 | Haire .................................. | 137/359 |
| 1,019,000 | 2/1912 | Watson................................ | 285/305 |
| 1,835,301 | 12/1931 | Hennessey............................ | 4/191 |
| 2,535,016 | 12/1950 | Launder............................... | 285/305 X |
| 3,011,520 | 12/1961 | Barkelew............................. | 137/359 X |
| 3,080,570 | 3/1963 | Weddendorf, Jr..................... | 4/192 |
| 3,092,845 | 6/1963 | Mustee ................................ | 4/192 |

FOREIGN PATENTS OR APPLICATIONS

| | | | |
|---|---|---|---|
| 1,039,320 | 5/1953 | France................................. | 4/166 |
| 356,527 | 7/1922 | Germany ............................. | 4/166 |
| 411,729 | 11/1966 | Switzerland.......................... | 4/192 |

Primary Examiner—Wayne A. Morse, Jr.
Assistant Examiner—Donald B. Massenberg
Attorney—Jefferson Ehrlich, Tennes I. Erstad and Robert G. Crooks

[57] ABSTRACT

Involves an integrated composite plumbing fitting for a plumbing fixture. The integrated plumbing fitting includes all of the normal water control mechanism and is physically separated from the plumbing fixture, which may be a lavatory, with which the composite fitting is to be associated. The composite fitting includes two input water pipes, one for hot water and the other one for cold water, both connected to a mixing valve which may be controlled by a single lever. The integrated fitting also includes two stop valves, associated respectively with the two input water pipes, for closing either or both of the pipes whenever repairs or replacements or investigations are to be made. The integrated fitting also includes an exposed spout-end for discharging a stream of water received from a common outlet of the mixing valve. The integrated fitting also includes a case or housing, which may be made of metallic or plastic materials, and the entire structure is mounted in or against the wall above the plumbing fixture, namely, the lavatory. By manipulating the lever, hot or cold water, or a mixture thereof, may be fed through the spout-end from an elevated position above the basin of the lavatory, and the water may be accumulated in the basin and later released through the drain of the lavatory to the sewer system. The integrated fitting is arranged so that the conduits are closely coupled together by removable clips and all of the parts of the structure may be readily assembled or disassembled. The plumbing fixture itself has no water control mechanism, all of such mechanism being confined to the integrated fitting structure.

1 Claim, 7 Drawing Figures

INVENTOR,
JOSEPH W. OWINGS

BY Jefferson Ehrlich
ATTORNEY

INTEGRATED PLUMBING FITTING

This invention relates to water control fittings for plumbing fixtures, such as lavatories, and, more especially, to water control fittings which are physically separated from the fixtures with which they are associated.

More particularly, this invention relates to the combination of a plumbing fixture, such as a lavatory, and an integrated composite fitting for the lavatory, the fitting being permanently stationed at a position physically spaced from the lavatory and yet the fitting controls the flow of water into the lavatory. Still more particularly, this invention relates to the combination of such a plumbing fixture and such an integrated composite fitting in which the fitting includes also integrated stop valves, which are associated with input pipes, for stopping or re-starting the flow of water through the fitting and into the basin of the lavatory.

A conventional plumbing fixture, such as a lavatory, usually includes a flat wall which may be horizontally oriented (sometimes called a "deck") or a wall which may be vertically oriented, in each case the wall usually having three openings, one for receiving the control valve for the hot water, another for receiving the control valve for the cold water, and a third for receiving the spout mechanism which is coupled by appropriate piping to the two control valves and through which water flows and is discharged into the basin of the plumbing fixture controlled by either or both valves. The several fittings are quite conventional and, except for minor variations, customarily form part of every complete lavatory as it is available in the market and purchased and used in a home or office.

Such conventional plumbing fittings are often mounted at the factory in their assigned positions in the openings of the lavatory and, because they are made of metal while the fixture is made of chinaware, breakages quite naturally occur, especially when pressure is applied for mounting or connecting or interconnecting or repairing the plumbing fittings. Such breakages in the chinaware render the plumbing fixture unsalable and unusable and hence the entire lavatory assembly must be discarded. This usually entails substantial monetary and other losses. The present invention, by omitting from the lavatory as it is manufactured and sold and used, all the water control fittings which are customarily mounted on the deck of a conventional lavatory or on a side wall of the basin of a conventional lavatory, inherently avoids all such breakages because there cannot be any physical or mechanical contact or pressure between the plumbing fixture and the required water control fittings. The removal from the lavatory of all fittings disposes of an important breakage problem.

Moreover, after such a conventional plumbing fixture and its mounted fittings are shipped as a unit to a building for installation, breakages may also occur not alone in transportation, but also when a worker applies a wrench to the fittings or uses some other expedient to establish a good, leakproof connection between the fittings of the lavatory and the existing pipes of the building. If pipes are not properly aligned with the fittings, as is often the case, the plumber may employ nipples or tees or other plumbing devices to produce the necessary alignment. Sometimes a pipe is bent or otherwise stressed to achieve the required alignment. These short-cuts and expedients introduce problems in installations. Sometimes the chinaware of the lavatory may be stressed unduly and chipped or broken and thereby marred in appearance. Such breakages may create difficult situations that occur all too often and are better avoided. They are costly annoyances and they also introduce costly delays in installation or service use.

Furthermore, the usual control valves of the conventional plumbing fixture, such as a lavatory, or its faucet, sometimes require repairs or replacements and, for this purpose, it is frequently necessary to reach the main water valve to turn off the water before any such repairs or replacements may be made. This sometimes requires the help of an assistant and the operation then becomes quite complex as well as expensive.

In accordance with the present invention, small, simple stop valves are unified into the plumbing fitting as integral parts thereof and are positioned closely adjacent to the control valve and supply pipes in which adjustments may have to be made. Hence, the main water valve need not be searched for in other parts of the building and turned off and later turned on. By this arrangement, repairs and replacements may be easily made in the composite fitting by the home owner or by others promptly without cutting off water supply to other installations. The stop valves are integrated into the fitting of this invention and each one is immediately adjacent to the control valve and can readily be opened or closed, as may be desired, for repairs or replacements.

The integrated plumbing fitting of this invention may be installed in a building at the time of its construction or renovation so that it may be in place and available well before the lavatory may be selected and shipped and installed. The lavatory itself, free of the usual plumbing fittings, therefore, may be floor-mounted or wall-mounted, in the usual way, without regard to the fittings with which the lavatory will be associated even though the fittings will be spaced from the lavatory. Only a drain or sewer pipe has to be coupled to the plumbing fixture to remove and dispose of the water discharged from the basin of the lavatory and this completes the entire installation.

An integrated plumbing fitting of the kind involved in the present invention is quite small and compact, almost miniaturized, and, because its housing may be made of colorful metallic materials or plastics, the structure is simple and its cost of manufacture is low, its color may be matching or contrasting to the color of the plumbing fixture, and its installation can be quickly achieved at low cost. By changing the color of the housing, the color combination may be varied whenever desired. By manipulation of the handle of the plumbing fitting, the user may produce a smooth laminar stream passing in a trajectory path into the basin of the lavatory.

This invention and its objects and features will be better and more completely understood from the following more detailed description and explanation of one form of equipment suitable for carrying out the principles of this invention, in which FIG. 1 illustrates a perspective of a lavatory or other plumbing fixture, along with a wall-mounted integrated fitting;

The same reference characters will be employed to designate the same or similar parts wherever they may occur throughout the drawing.

Figure 1:
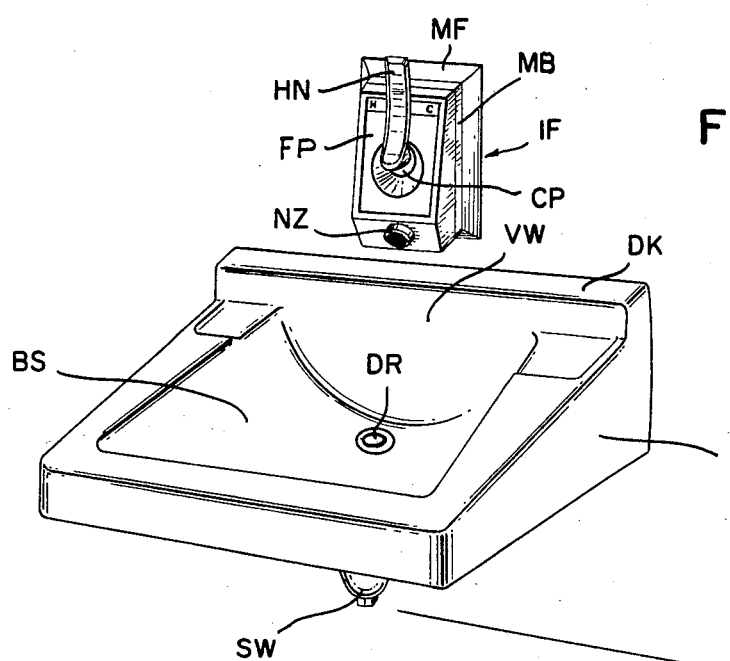
Figure 2:
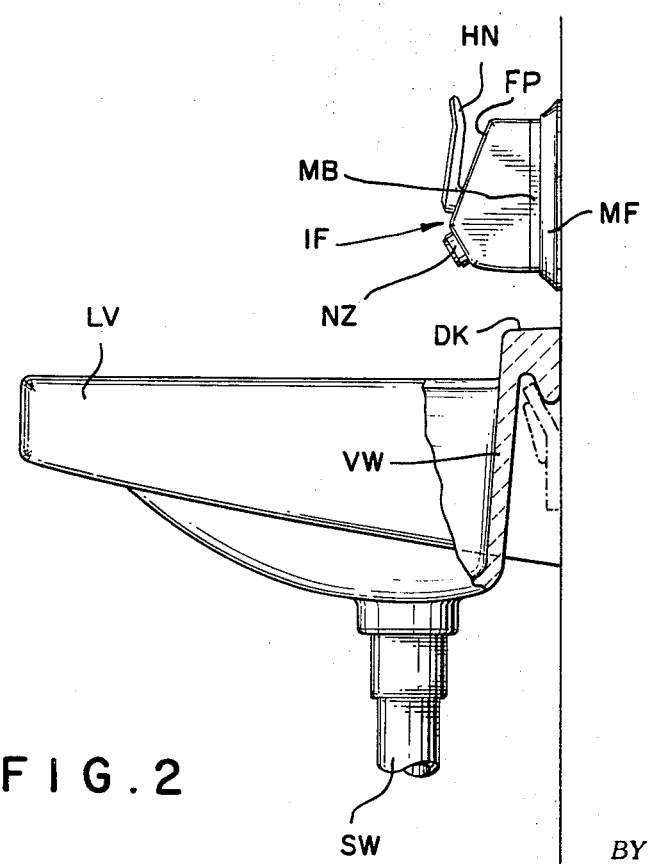
FIG. 2 illustrates a side elevational view, partly in section, of the combination shown in FIG. 1.
Figure 3:
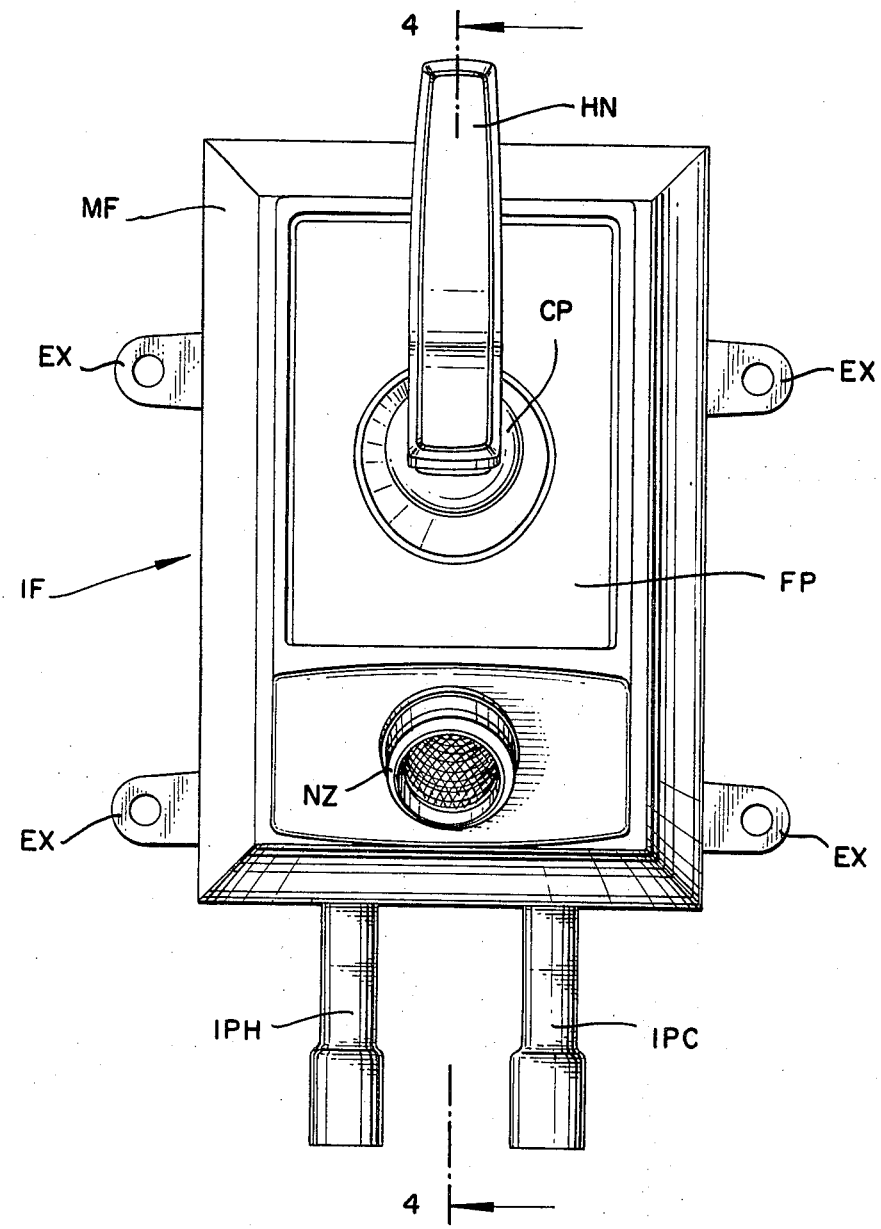
FIG. 3 shows a front elevational view of the same plumbing fitting together with the incoming water pipes which may be mounted within or adjacent to the wall.

Referring generally to the several figures of the drawing, there is shown a lavatory LV and an integrated plumbing fitting IF which is spaced and removed from the lavatory LV. It will be observed that the lavatory LV has a horizontal deck DK and a vertical back wall VW for its basin BS, but the deck DK and the wall VW of the lavatory LV are devoid of valves or spouts or other mechanism for the control of the flow of water into the basin BS of the lavatory LV and there are no openings in the lavatory LV for such parts. However, the lavatory LV includes a conventional drain port DR which leads to a conventional sewer pipe SW through which water may be released from the basin BS. The lavatory may be made of any material, for example, conventional chinaware or plastic but, in either case, no water control fittings or faucet are to be associated on or in the lavatory LV. This simplifies the construction and installation problems of the lavatory.

Figure 4:
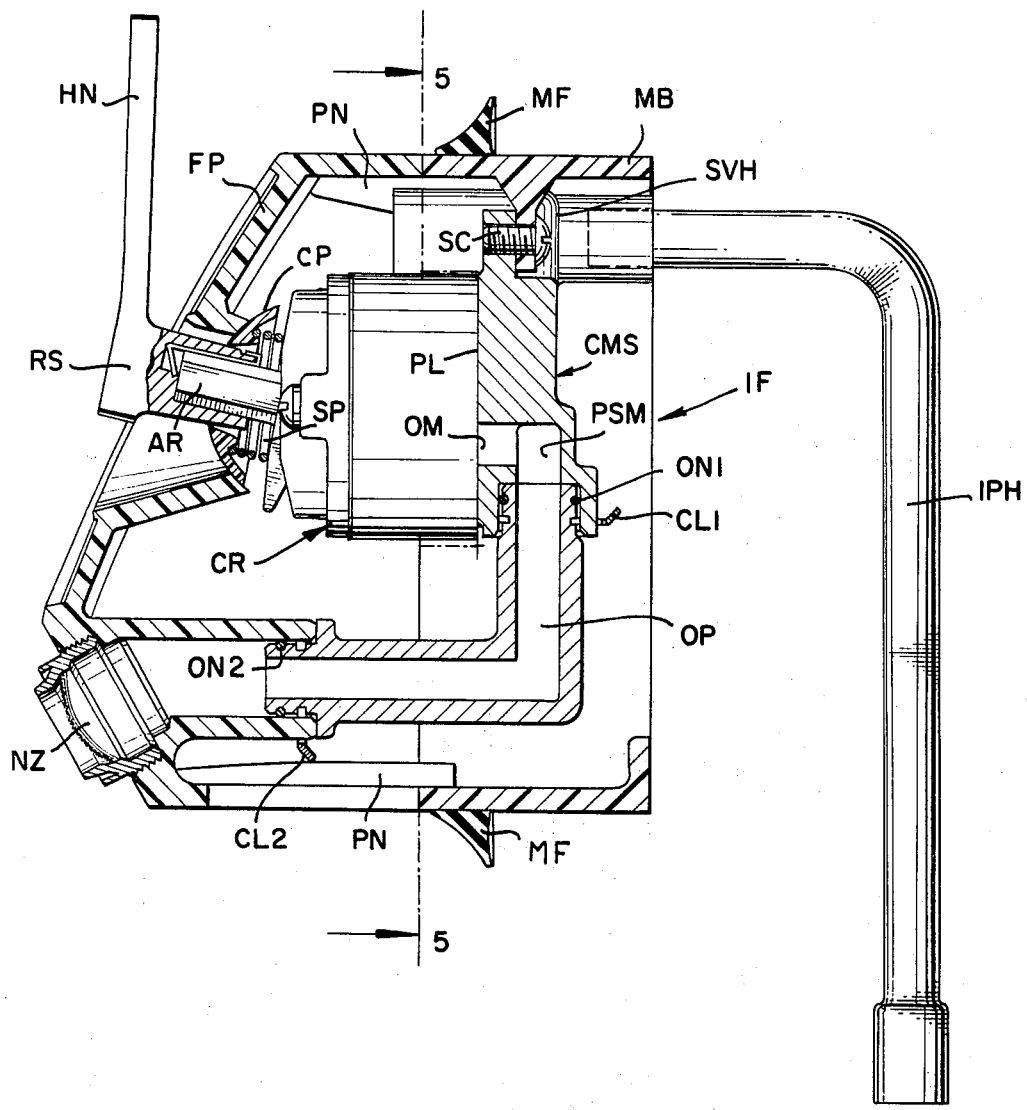
FIG. 4 shows a cross-sectional view taken along the lines 4—4 of FIG. 3.

Referring more particularly to FIG. 4, it includes a handle HN, a nozzle NZ preferably employing a stream straightener, an input water pipe IPH, which is one of two input water pipes affixed to the integrated fitting IF, an output pipe OP which is within the integrated fitting IF, and mechanism including the cartridge CR which, as will be later explained, couples the two input pipes IPH and IPC to the common output pipe OP for controlling the feeding and mixing of water flowing through the nozzle NZ and into the basin of the lavatory LV. As will be further explained, the handle HN, when in its vertical position, will yield a substantially even mixture of hot and cold water supplied through the pipes IPH and IPC to the mixing chamber of the cartridge CR from which the tempered water will be fed through the outpipe OP, then through the nozzle NZ, and then into the lavatory LV. The temperature of the water may be changed as desired by manipulation of the handle HN. To raise the temperature, it is only necessary to move the handle toward the left, while a lowered temperature will be reached by moving the handle HN to the right. In either case, the volume of water may be controlled independently of the temperature by changing the angle of the handle HN from its relatively vertical position to a position forming an angle more nearly receding from the vertical position, the volume of water depending upon the angle of departure of the handle HN from its vertical position. The water may be shut off by returning the handle HN to its uppermost position.

Figure 6:
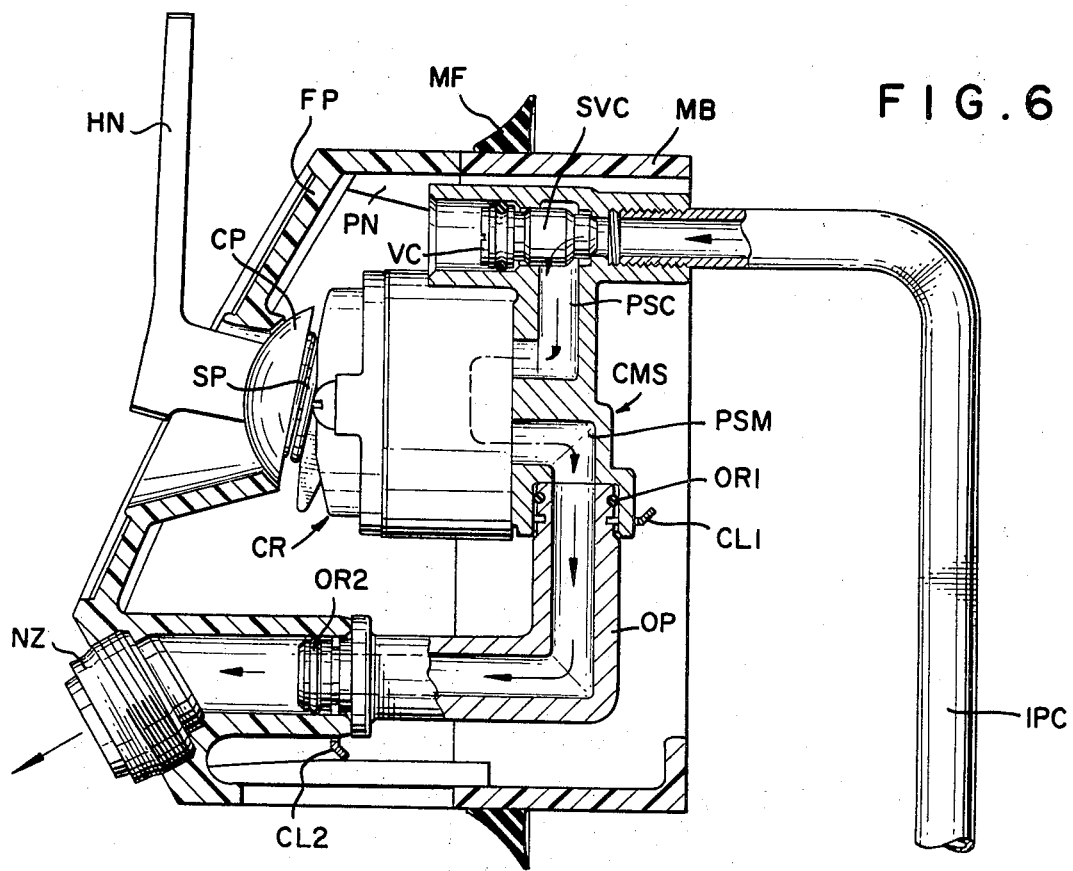
FIG. 6 shows a cross-sectional view when taken along the lines 6—6 of FIG. 5.
Figure 7:
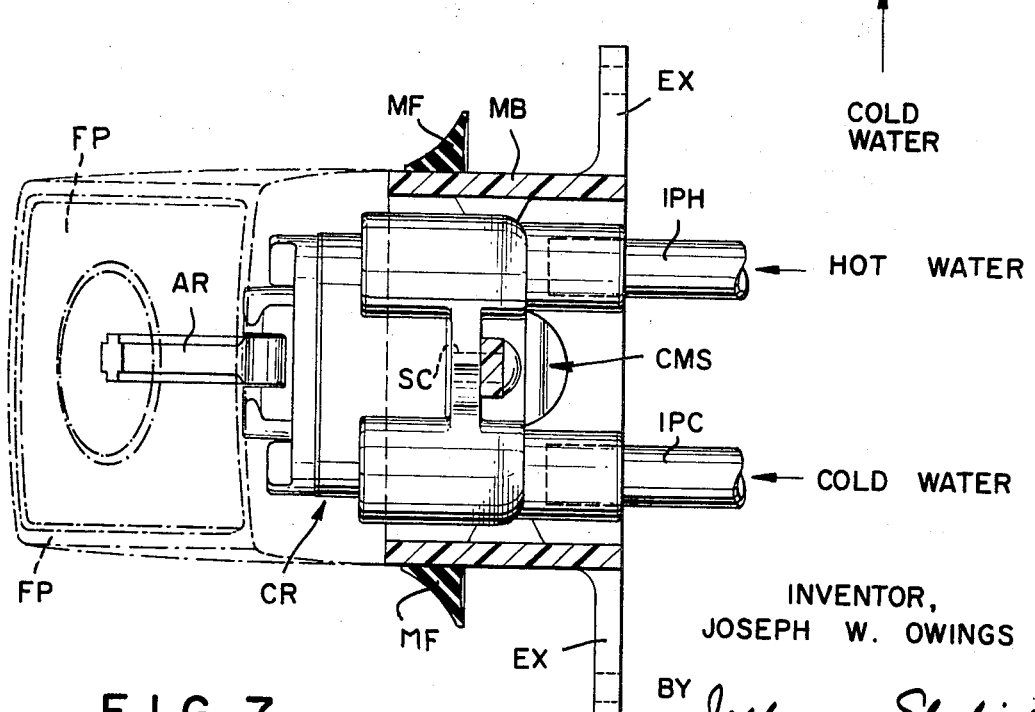
FIG. 7 shows a top plan view, partially broken away, of the adjacent arrangement shown in FIG. 6.

The cartridge CR is one of the important components of the mixing valve structure preferably employed in connection with this invention. The cartridge may include a pair of plates (not shown) made of very hard ceramic materials which include input ports for receiving the hot water and cold water and a common outlet port for discharging the mixture of water. The handle HN is mechanically coupled to the actuating arm AR associated with cartridge CR. Hence, any movement of the handle HN is reflected by a corresponding displacement of the arm AR which, in turn, causes one of the ceramic plates to slide over the surface of the other or stationary plate to regulate the relative openings of the inlet and outlet ports. The two ceramic plates are always maintained in contact with each other even during the sliding motion, the plate coupled to and controlled by the arm AR being slidable across the other or stationary plate. In FIG. 6, for example, if the stop valve SVC is opened by adjusting its threaded member VC, cold water received from the pipe IPC will be fed through an individual passage PSC into the openings of the two ceramic plates of the cartridge CR, then through the common passage PSM, then through the output pipe OP and through the nozzle NZ, as shown generally by the directional arrows. It will be apparent that a like passage is provided between the input pipe IPH and the common passage PSM through corresponding openings of the cartridge CR when the corresponding stop valve SVH is open. The hot and cold waters are mixed while travelling through the cartridge CR and the tempered water is then fed through the output pipe OP as already explained.

A suitable form of cartridge for a single lever mechanism to be incorporated into the structure of this invention is shown and fully described in U.S. Pat. No. 3,533,436, of R. G. Parkison. issued Oct. 13, 1970, and assigned to the assignee of the present application. That patent more fully describes the operation as well as the features of the single lever cartridge mechanism CR. The disclosure of that patent may be considered as part of the present disclosure.

Figure 5:
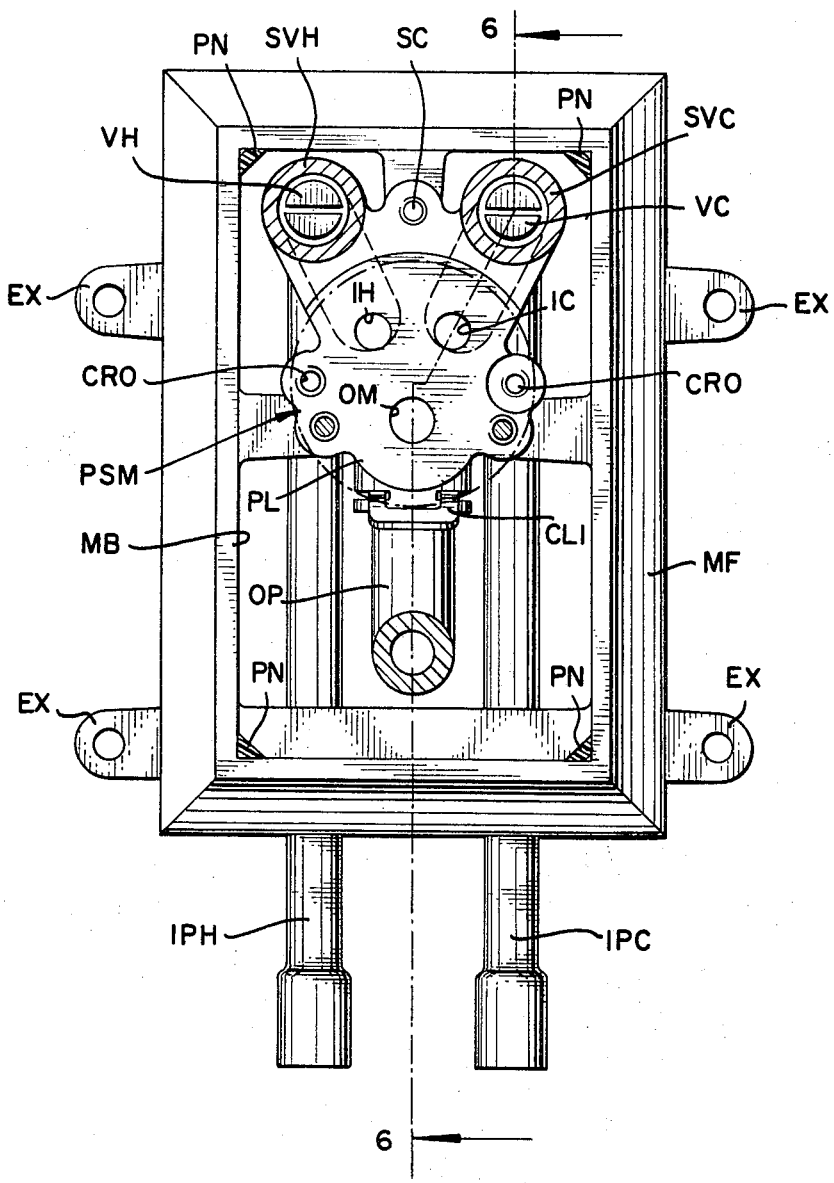
FIG. 5 shows a cross-sectional view taken along the lines 5—5 of FIG. 4.

In FIG. 5, there is shown a front view of the apertured base plate PL to which the cartridge CR is affixed. The base plate PL includes an input port IH for hot water and an input port IC for cold water, these two ports receiving the two streams of water to be mixed in the cartridge CR. The mixed water is fed through the outlet port OM of the cartridge CR and then through the outlet pipe OP. The base plate PL is shown as part of a common molded structure CMS, which may be made of metal, such as brass, or plastic material, the structure CMS also including the two stop valves SVC and SVH and their respective threaded members VC and VH. The molded structure CMS also includes threaded openings for receiving screws SC for holding the structure CMS within the housing of the openings for receiving screws SC for holding the structure CMS within the housing of the fitting IF. The base plate PL also includes threaded openings designated CRO which are employed to fasten the cartridge CR to the base plate PL.

As already explained, the inlet pipes IPH and IPC feed hot and cold water into the inlet ports IH and IC respectively of the cartridge mechanism CR, and the two stop valves SVH and SVC are employed for independently shutting off the hot water and cold water respectively, whenever desired. The two stop valves have threaded members VH and VC, respectively, each of which, when turned clockwise, will close the respective stop valve and, when turned counterclockwise, will open the respective stop valve. The stop valves should be closed whenever repairs are to be made on the pipelines or on the control mechanism. On the other hand, the stop valves should be opened, after the repairs have been completed. The stop valves may also be adjusted to regulate the maximum or minimum water flow conditions of the cartridge structure CR.

The outlet pipe OP fluidically couples the mixed water passage PSM to the nozzle NZ (see FIG. 6). The outlet pipe OP is coupled to and held locked against the passage PSM by means of a U-shaped clip CL1. A similar U-shaped clip CL2 couples the outlet pipe OP to the passage leading to the nozzle NZ. No threaded members are employed for coupling the outlet pipe OP fluidically between the passage PSM and the nozzle NZ. Each of the clips CL1 and CL2 is a bifurcated metallic clip made of a springy material and shaped generally in the form of a horseshoe and having curved inner sides for gripping the grooved segments of the curved or circular pipe OP. Each of these clips CL1 and CL2 may be removed merely by pulling the clip away from the outlet pipe OP. The clip is easily installed in place in the corresponding grooved segment of pipe OP merely by moving the clip in the direction of the outlet pipe OP. Corresponding O-rings OR1 and OR2 inserted in other grooves of pipe OP prevent leakage of water into the external housing while the clips CL1 and CL2 permit easy installation and easy removal of the outlet pipe OP, as may be desired.

The external housing of the integrated fitting IF is composed of two main segments which may be referred to as the mounting box MB and the face plate FP. Both of these members may be made of any material whether metallic or plastic, but both preferably made of a plastic material which may be pigmented in any desird colors. Pins PN are mounted in the face plate FP for guiding and positioning the face plate FP into the mounting box MB when the two are to be joined together and closed. The face plate FP includes the protruding nozzle NZ as a threaded component part of the face plate FP. The nozzle NZ is pointed toward the basin BS. It may be removed and replaced whenever desired. The face plate FP also includes an opening FPO for receiving the arm AR for coupling the arm AR to the shank SK of the handle HN. This coupling through arm AR enables the cartridge CR to be adjusted for the temperature and volume of the water by manipulation of the handle HN. The cover CP is retained against the face plate FP by means of a spring SP so as to keep the face plate FP taut.

A frame MF, which may be made of any material, preferably a stretchable material such as rubber, is retained around the exterior housing of the integrated fitting IF and around the periphery of its mounting box MB. It serves not only to enhance the appearance of the composite structure, but also to retard leakage of water into the box MB. The mounting box MB may have, for example, four extensions, each designated EX and each having an opening for receiving a screw or other fastener for fastening the mounting box against the underside of the wall of the room in which the fitting IF is to be permanently located.

The nozzle NZ is shown as fixed within the face plate FP of the external housing and positioned at an acute angle with respect to the wall so as to emit a downwardly directed trajectory stream of water toward the basin BS of the lavatory LV. Although shown as a fixedly mounted structure, the nozzle may, if desired, be adjustably mounted in the face plate FP so that the angle of the nozzle NZ may be changed by any desired amount with respect to the wall. So adjusted, the angle of the nozzle may be controlled in accordance with the parameters, such as the pressure, volume, etc., of the incoming water.

The physical separation of the integrated fitting IF from the plumbing fixture LV enables the user to change the plumbing fixture whenever desired without requiring any work to be done on the integrated fitting or, conversely, to change the integrated fitting without requiring any work to be done on the plumbing fixture. The plumbing fixture and the integrated fitting are coordinated but physically independent members.

The integrated fitting of this invention is especially suitable for use in pre-fabricated plumbing construction for low cost housing. All of the integrated fittings of the entire building may be installed in the early stages of the construction program, well before the plumbing fixtures have been supplied and installed in the building for association with the respective integrated fittings. The soldering or brazing of the input pipes 1PH and 1PC and the water supply system may be performed by a semi-skilled worker well before the kitchens and bathrooms have been supplied with their plumbing fixtures.

By integrating the stop valves SVH and SVC into the base plate BL and thereby coupling the fluidic paths between the base plate and the cartridge CR and the nozzle NZ, the integrated fitting structure employs fewer parts than conventional fittings and equivalent installations, uses lower cost materials, simplifies the structure and reduces its size, permits of a distinctive housing and, moreover, reduces the steps and the labor required to complete the installation and to make repairs therein. Relatively minor skills are required for installation, repair and maintenance services.

While this invention has been shown and described in certain particular arrangements and organizations for illustration and explanation, it will be apparent that the arrangements and organizations may be considerably modified within the scope of the invention.

What is claimed is:

1. The combination of a lavatory constructed to be used without plumbing fittings and constructed without openings for plumbing fittings but having a drain in the basin of the lavatory for receiving water fed to the lavatory, a separately housed and integrated fitting including water controls to control the flow of water through the fitting and a spout-end for feeding water into said lavatory, the housing of said fitting being wall-mounted and spaced above and separated from and independent of said lavatory, said integrated fitting having a single exposed handle to operate the water controls to regulate the water flow through the spout-end into said lavatory, the spout-end being spaced from the wall and positioned at an acute angle with respect to the wall so as to be pointed toward said lavatory to yield and outwardly and downwardly directed trajectory flow path to the basin of said lavatory, said integrated fitting including a valve mechanism having adjacent disks one of which is slidable against the other and having apertures therein for receiving hot and cold water to yield a mixture of water at a temperature, controlled by the position of the handle, to be fed through the spout-end, said integrated fitting including a coupling member for fluidically coupling the output end of the valve mechanism to the spout-end, said coupling member comprising a conduit grooved at both ends, each end of the conduit having a bifurcated clip for fastening the end of the conduit to the integrated fitting, and two pipe lines for supplying hot and cold water respectively to input ports of the valve mechanism of the integrated fitting, and two stop valves included as unified parts of the integrated fitting, said stop valves coupling said pipe lines to the integrated fitting.

* * * * *